United States Patent
Nomura et al.

(10) Patent No.: US 7,732,078 B2
(45) Date of Patent: Jun. 8, 2010

(54) NON-AQUEOUS ELECTROLYTE BATTERY PACK COMPRISING A LIQUID-ABSORBENT COMPOSITION

(75) Inventors: Mamiko Nomura, Tochigi (JP); Hiroshi Samukawa, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 1161 days.

(21) Appl. No.: 10/519,357

(22) PCT Filed: Dec. 19, 2003

(86) PCT No.: PCT/JP03/16331

§ 371 (c)(1),
(2), (4) Date: Dec. 28, 2004

(87) PCT Pub. No.: WO2004/065483

PCT Pub. Date: Aug. 5, 2004

(65) Prior Publication Data

US 2006/0022634 A1 Feb. 2, 2006

(30) Foreign Application Priority Data

Jan. 21, 2003 (JP) ............................... 2003-012838

(51) Int. Cl.
*H01M 8/00* (2006.01)
*H01M 2/00* (2006.01)
*H01M 2/36* (2006.01)
*H01M 4/82* (2006.01)

(52) U.S. Cl. ............................. 429/34; 429/95; 429/12; 29/623.5

(58) Field of Classification Search .................. 429/34, 429/12, 95; 320/107; 29/623.5
See application file for complete search history.

(56) References Cited

U.S. PATENT DOCUMENTS 6,306,414 B1 * 10/2001 Koike ......................... 424/405

FOREIGN PATENT DOCUMENTS

JP S50-82143 6/1975

(Continued)

OTHER PUBLICATIONS

JPO Office Action, Nov. 25, 2008 (English Translation).

*Primary Examiner*—Patrick Ryan
*Assistant Examiner*—Karie O'Neill Apicella
(74) *Attorney, Agent, or Firm*—Oliff & Berridge, PLC

(57) ABSTRACT

A liquid-absorbent composition, which has a liquid-absorbent crosslinked resin that exhibits excellent absorption of the nonaqueous electrolyte of nonaqueous electrolyte secondary cells that constitute a nonaqueous electrolyte battery pack (and particularly a lithium ion nonaqueous electrolyte rechargeable battery pack), contains a powder of a liquid-absorbent crosslinked resin produced by crosslinking a methyl vinyl ether/maleic anhydride copolymer with a polyfunctional isocyanate compound, and a binder resin. Also, a liquid-absorbent sheet for a nonaqueous electrolyte battery pack contains supporting substrate and formed on one side of a supporting substrate a liquid-absorbent crosslinked resin layer, produced by crosslinking a methyl vinyl ether/maleic anhydride copolymer with a polyfunctional isocyanate compound. The nonaqueous electrolyte battery pack contains a battery case and disposed within the battery pack a nonaqueous electrolyte battery cell, a wiring circuit board, and an electrolyte absorption member formed from the liquid-absorbent sheet for absorbing electrolyte in the event that electrolyte leaks from the nonaqueous electrolyte battery cell.

15 Claims, 5 Drawing Sheets

FOREIGN PATENT DOCUMENTS

| | | |
|---|---|---|
| JP | S50-78583 | 7/1975 |
| JP | A 58-46959 | 3/1983 |
| JP | A 4-176469 | 6/1992 |
| JP | A 9-169085 | 6/1997 |
| JP | 09175002 A * | 7/1997 |
| JP | A 9-175002 | 7/1997 |
| JP | 2000-306559 | 11/2000 |
| JP | 2001351588 A * | 12/2001 |
| JP | A 2001-351588 | 12/2001 |

* cited by examiner

NON-AQUEOUS ELECTROLYTE BATTERY PACK COMPRISING A LIQUID-ABSORBENT COMPOSITION

TECHNICAL FIELD

This invention relates to a liquid-absorbent composition and liquid-absorbent sheet for absorbing electrolyte in the event that electrolyte leaks from a nonaqueous electrolyte battery cell inside a nonaqueous electrolyte battery pack, and to a nonaqueous electrolyte battery pack in which this composition and sheet are used.

BACKGROUND ART

Battery packs having a plurality of primary cells or secondary cells and a wiring circuit board housed in a battery case are widely used. If the electrolyte leaks from any of the cells in such a battery pack, it can corrode the wiring of the wiring circuit board, which can interrupt conduction or, conversely, can lead to a short. In view of this, it has been proposed that an absorbent member equipped with a liquid absorbent capable of absorbing electrolyte be disposed at or near locations of contact with the cells inside the battery pack so that the above-mentioned problems of corrosion and shorting will not occur (Japanese Patent Application Laid-Open No. 2001-351588). A variety of polymer materials can be used as the liquid absorbent here, such as adsorptive types, gelling types, and self-swelling types. Specific examples include polyacrylate-based water-absorbent resins, starch-grafted copolymer-based water-absorbent resins, polyvinyl alcohol-based water-absorbent resins, polyacrylamide-based water-absorbent resins, isobutylene/maleic acid copolymer-based water-absorbent resins, long-chain alkyl acrylate crosslinked polymers, and polynorbornenes.

However, these liquid absorbents had the problem of not adequately absorbing carbonate-based solvents, such as propylene carbonate or ethylene carbonate, which are widely used in the non-aqueous electrolyte battery packs that have become so popular in recent years, and particularly in the non-aqueous electrolyte secondary cells that constitute a lithium ion nonaqueous electrolyte rechargeable battery pack.

It is an object of the present invention to solve these problems encountered with the prior art, and to provide a liquid-absorbent composition and liquid-absorbent sheet containing a liquid-absorbent crosslinked resin that exhibits excellent absorption of the nonaqueous electrolyte of nonaqueous electrolyte secondary cells that constitute a nonaqueous electrolyte battery pack (and particularly a lithium ion nonaqueous electrolyte rechargeable battery pack), and to provide a method for manufacturing such a liquid-absorbent crosslinked resin, and to provide a battery pack comprising an electrolyte absorption member formed from such a liquid-absorbent composition or liquid-absorbent sheet.

DISCLOSURE OF THE INVENTION

The inventors arrived at the present invention upon discovering that when a methyl vinyl ether/maleic anhydride copolymer is crosslinked with a polyfunctional isocyanate compound in a solvent such as MEK, which produces a gel of a liquid-absorbent crosslinked resin that holds the solvent therein, and this liquid-absorbent crosslinked resin is extremely well capable of absorbing and holding the non-aqueous electrolyte of a nonaqueous electrolyte cell.

Specifically, the present invention provides a liquid-absorbent composition, which comprises a powder of a liquid-absorbent crosslinked resin produced by crosslinking a methyl vinyl ether/maleic anhydride copolymer with a polyfunctional isocyanate compound, and a binder resin.

The present invention also provides a liquid-absorbent sheet, which comprises a supporting substrate and formed on one side thereof a liquid-absorbent crosslinked resin layer produced by crosslinking a methyl vinyl ether/maleic anhydride copolymer with a polyfunctional isocyanate compound.

The present invention further provides a method for manufacturing a liquid-absorbent crosslinked resin, which comprises dissolving a methyl vinyl ether/maleic anhydride copolymer in an amount of 3 to 35 wt % in a solvent with an SP value of 9 to 14 to obtain a reaction solution, and adding a polyfunctional isocyanate compound to the reaction solution to perform a crosslinking reaction.

The present invention also provides a nonaqueous electrolyte battery pack, which comprises a battery case and disposed within the battery case a nonaqueous electrolyte battery cell, a wiring circuit board, and an electrolyte absorption member for absorbing electrolyte in the event that electrolyte leaks from a nonaqueous electrolyte battery cell, wherein said electrolyte absorption member is formed from the above-mentioned liquid-absorbent composition or liquid-absorbent sheet.

BEST MODE FOR CARRYING OUT THE INVENTION

Figure 1:
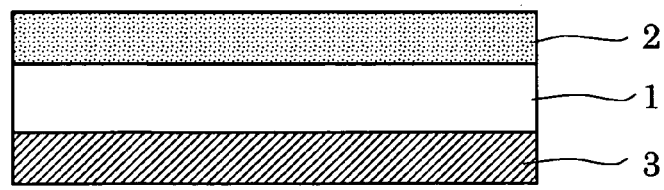
FIG. 1 is a cross section of the liquid-absorbent sheet of the present invention.

First, the liquid-absorbent composition of the present invention will be described.

This liquid-absorbent composition contains a powder of a liquid-absorbent crosslinked resin produced by crosslinking a methyl vinyl ether/maleic anhydride copolymer with a polyfunctional isocyanate compound, and a binder resin. A liquid-absorbent crosslinked resin such as this is capable of absorbing and holding a large quantity of the carbonate-based solvents used in nonaqueous electrolyte battery cells, and particularly propylene carbonate. Therefore, a composition produced by dispersing a powder of this liquid-absorbent crosslinked resin along with a dispersion solvent (such as toluene, methyl ethyl ketone, or ethanol) as needed in a binder resin will be useful as an electrolyte absorption member for a nonaqueous electrolyte battery pack. Furthermore, this composition can be handled as a resin paint, so it can be freely formed in a variety of shapes by any known coating or dispensing method, which means that there is greater latitude in the shape of the electrolyte absorption member.

Effective crosslinking will be difficult to achieve if the weight average molecular weight of the methyl vinyl ether/maleic anhydride copolymer used in the present invention is too low, but the nonaqueous electrolyte will not readily swell after crosslinking if the weight is too high, so this weight is preferably between 50,000 and 1,200,000, and even more preferably between 200,000 and 900,000.

Although the polyfunctional isocyanate compound used in the present invention functions as a crosslinking agent that crosslinks a methyl vinyl ether/maleic anhydride copolymer, from the standpoint of how well nonaqueous electrolyte is held, it is particularly favorable in the present invention to use a trifunctional isocyanate compound having three isocyanate groups. Specific examples of such trifunctional isocyanate compounds include trimethylolpropane adducts, trimers having an isocyanurate ring, and triphenylmethane triisocyanate.

Also, since the nonaqueous electrolyte will not readily swell if the amount of polyfunctional isocyanate compound is too large, and intended strength after swelling will not be obtained if this amount is too small, the crosslinking ratio of the polyfunctional isocyanate compound to the methyl vinyl ether/maleic anhydride copolymer in the present invention is preferably 0.1 to 2 mol, and even more preferably 0.2 to 1 mol, of polyfunctional isocyanate compound per 100 mol of the constituent monomer units of the methyl vinyl ether/maleic anhydride copolymer.

In the present invention, the crosslinking of the methyl vinyl ether/maleic anhydride copolymer and the polyfunctional isocyanate compound can be accomplished by a conventional method, such as adding the methyl vinyl ether/maleic anhydride copolymer and polyfunctional isocyanate compound to a solvent (such as MEK) and heating to within the range of 25 to 80° C.

The liquid-absorbent crosslinked resin thus obtained is usually in the form of a gel that contains the solvent used in the crosslinking reaction, and with the liquid-absorbent composition of the present invention, this gel is dried and powderized. This powderization may be accomplished by a conventional pulverization method (such as physical grinding) is employed to pulverize the dried liquid-absorbent crosslinked resin. If the average particle size of this powder is too small, the powder will clump, but the surface area will be small if this size is too large, so this size is preferably from 0.1 to 150 μm, and even more preferably 2 to 50 μm.

AS the binder resin in which this liquid-absorbent crosslinked resin powder is dispersed, there is used one that is soluble in a nonaqueous electrolyte, and particularly a carbonate-based solvent, such as propylene carbonate or ethylene carbonate. Examples of this binder resin include a methyl vinyl ether/maleic anhydride copolymer, cyanoethyl-modified starch, and polyethylene glycol.

Since liquid absorption will decrease if there is too little liquid-absorbent crosslinked resin powder, and the composition will crumble into a powder without being fixed if there is too much of this powder, the liquid-absorbent crosslinked resin powder and the binder resin are preferably used in proportions such that there are 3 to 100 weight parts, and even more preferably 10 to 50 weight parts, of binder resin per 100 weight parts liquid-absorbent crosslinked resin powder.

The liquid-absorbent sheet of the present invention, which is useful as an electrolyte absorption member of a nonaqueous electrolyte battery pack, will now be described.

Figure 2:
FIG. 2 is a cross section of the liquid-absorbent sheet of the present invention.

As shown in FIG. 1, this liquid-absorbent sheet has a structure in which a liquid-absorbent crosslinked resin layer 2, produced by crosslinking a methyl vinyl ether/maleic anhydride copolymer with a polyfunctional isocyanate compound, is formed on one side of a supporting substrate 1. It is preferable in this case for an adhesive layer 3 to be formed on the other side of the supporting substrate 1. This allows the liquid-absorbent sheet to be installed more easily in the battery case. Also, as shown in FIG. 2, instead of providing an adhesive layer, a pressure-sensitive adhesive may be added to the liquid-absorbent crosslinked resin layer 2 so as to impart adhesive properties to the liquid-absorbent crosslinked resin layer 2 on the supporting substrate 1. In this case, the liquid-absorbent sheet can be installed after the battery cells have been installed in the battery pack.

Examples of the supporting substrate of the liquid-absorbent sheet of the present invention include a polypropylene film and a nonwoven fabric composed of polypropylene or other such plastic fibers or the like.

The liquid-absorbent crosslinked resin layer 2 may be formed by dispersing or dissolving a methyl vinyl ether/maleic anhydride copolymer and a polyfunctional isocyanate compound in a solvent, coating the supporting substrate 1 with this dispersion or solution by a standard method, and heating to gel the coating.

Any known pressure-sensitive adhesive can be suitably selected and used as the pressure-sensitive adhesive constituting the adhesive layer 3 provided to the back of the supporting substrate 1. Examples of pressure-sensitive adhesives that can be used to impart adhesive properties to the liquid-absorbent crosslinked resin layer 2 include known acrylic adhesives that are partially crosslinked.

The weight average molecular weight of the methyl vinyl ether/maleic anhydride copolymer used in the liquid-absorbent sheet of the present invention, the polyfunctional isocyanate compound, the crosslinking ratio of the polyfunctional isocyanate compound to the methyl vinyl ether/maleic anhydride copolymer, and so forth are the same as discussed above for the liquid-absorbent composition.

A particularly favorable method for manufacturing the liquid-absorbent crosslinked resin used in the above-mentioned liquid-absorbent composition and liquid-absorbent sheet will now be described. This manufacturing method involves dissolving the above-mentioned methyl vinyl ether/maleic anhydride copolymer in an amount of 3 to 35 wt % in a solvent with an SP value of 9 to 14, and adding the above-mentioned polyfunctional isocyanate compound to this solution to perform a crosslinking reaction.

The reason for using a solvent with an SP value of 9 to 14 here is that it dissolves sufficiently the methyl vinyl ether/maleic anhydride copolymer. Examples of such solvents include propylene carbonate (SP value=13.3), methyl ethyl ketone (MEK) (SP value=9.3), and ethyl acetate (SP value=9.1). Of these, MEK and ethyl acetate are preferably because of their comparatively low boiling points.

The reason for dissolving the methyl vinyl ether/maleic anhydride copolymer in such a solvent in an amount of 3 to 35 wt % is that if the amount is less than 3 wt %, the yield of the gellation reaction of the resulting liquid-absorbent crosslinked resin will be inadequate and there will be too much of the methyl vinyl ether/maleic anhydride copolymer that is not crosslinked, so the liquid-absorbent crosslinked resin will not hold enough nonaqueous electrolyte. Conversely, if the amount is over 35 wt %, there will be a drop in the absorbency of the liquid-absorbent crosslinked resin that is obtained.

The weight average molecular weight of the methyl vinyl ether/maleic anhydride copolymer used in the manufacturing method of the present invention, the polyfunctional isocyanate compound, the crosslinking ratio of the polyfunctional isocyanate compound to the methyl vinyl ether/maleic anhydride copolymer, and so forth are the same as discussed above for the liquid-absorbent composition.

Figure 3:
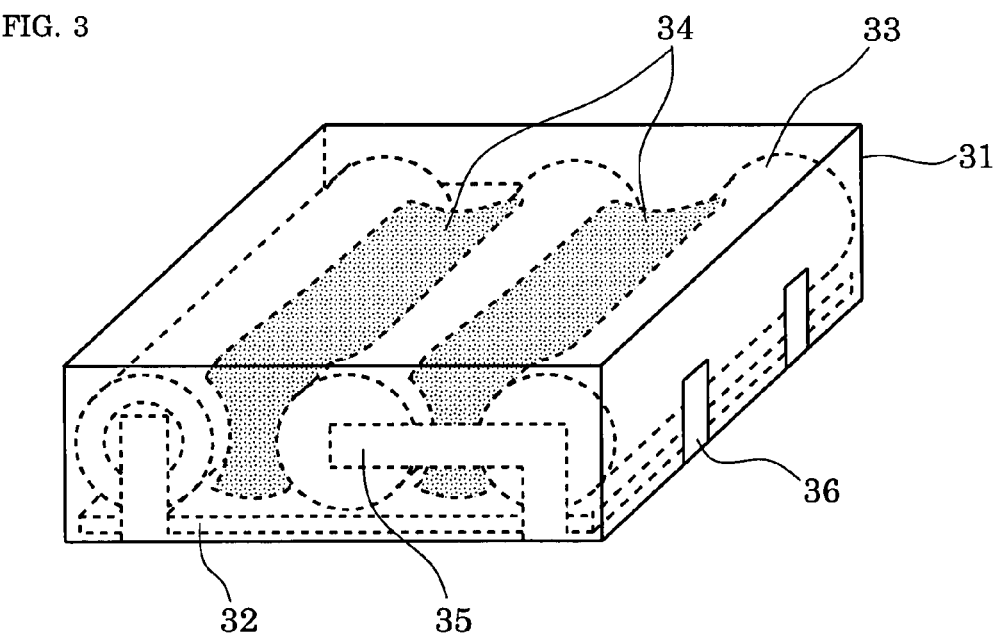
FIG. 3 is an oblique view of the nonaqueous electrolyte battery pack of the present invention.
Figure 4:
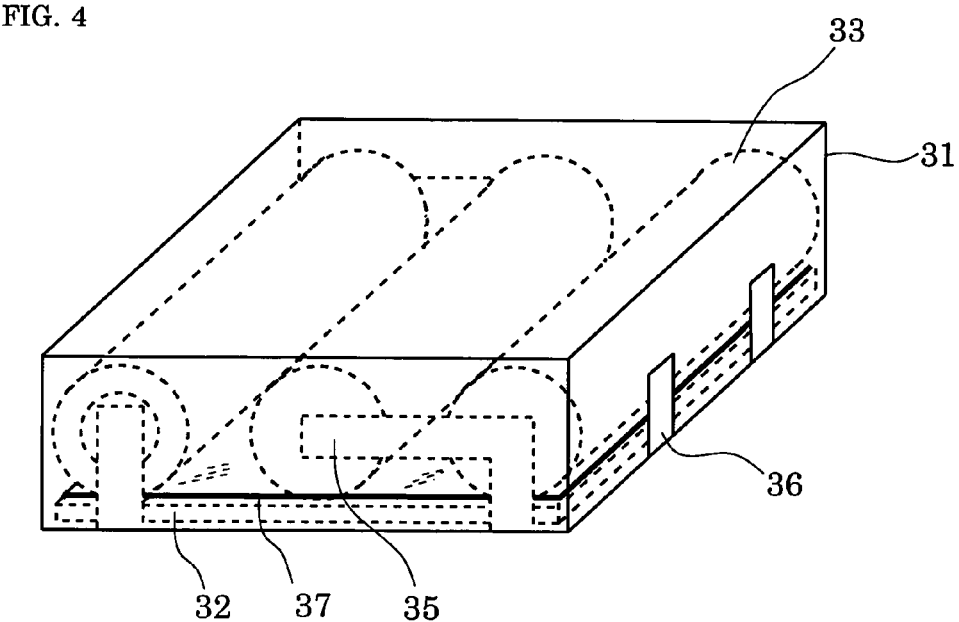
FIG. 4 is an oblique view of the nonaqueous electrolyte battery pack of the present invention.

The liquid-absorbent composition and liquid-absorbent sheet of the present invention can preferably be used to advantage as electrolyte absorption members in a nonaqueous electrolyte battery pack comprising a nonaqueous electrolyte battery cell, a wiring circuit board, and an electrolyte absorption member absorbing electrolyte in the event that electrolyte leaks from a nonaqueous electrolyte battery cell, all installed in a battery case. For example, as shown in FIG. 3, with a battery pack in which nonaqueous electrolyte battery cells 33 are disposed on a wiring circuit board 32 installed in a battery case 31, the spaces between the nonaqueous electrolyte battery cells 33 may be filled with a liquid-absorbent composition 34 as an electrolyte absorption member for absorbing the electrolyte in the event that electrolyte leaks from the nonaqueous electrolyte battery cells 33. Here, the nonaqueous electrolyte battery cells 33 and the wiring circuit board 32 are connected by metal leads 35, and communicate with external terminals 36. Also, as shown in FIG. 4, the liquid-absorbent sheet 37 described for FIG. 1 may be disposed between the wiring circuit board 32 and the nonaqueous electrolyte battery cells 33 so that the liquid-absorbent crosslinked resin layer is facing the nonaqueous electrolyte battery cells 33. Also, as shown in FIG. 5, the liquid-absorbent sheet 38 described for FIG. 2 may be disposed on the nonaqueous electrolyte battery cells 33 so that the liquid-absorbent crosslinked resin layer is facing the nonaqueous electrolyte battery cells 33.

Figure 5:
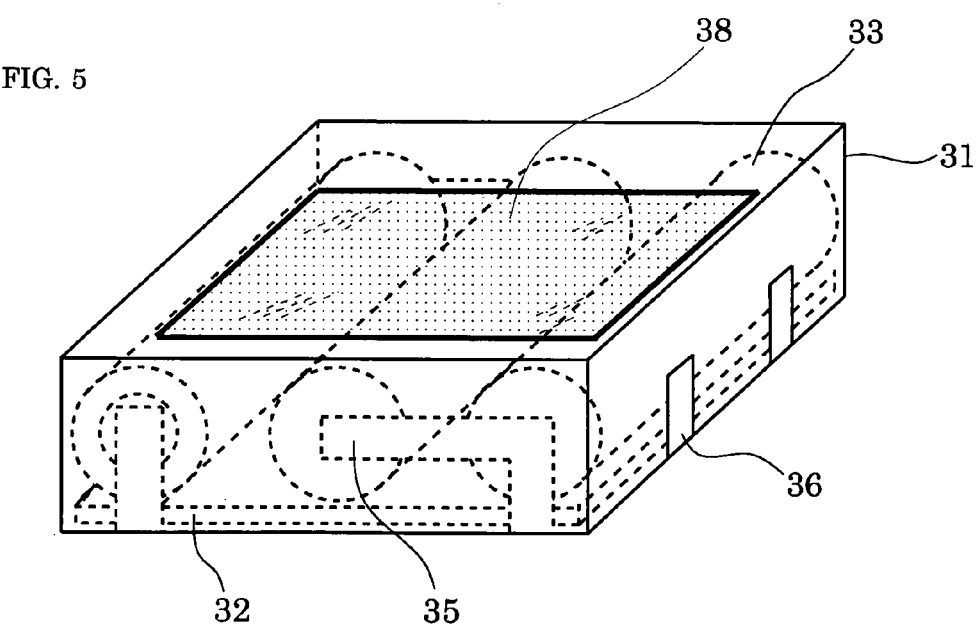
FIG. 5 is an oblique view of the nonaqueous electrolyte battery pack of the present invention.

In FIGS. 3 to 5, the shape of the battery case of the nonaqueous electrolyte battery pack was rectangular and the cells were cylindrical in shape, but the nonaqueous electrolyte battery pack of the present invention is not limited to these configurations, and the shape and layout can be set as dictated by the intended application. Nor are there any limitations on the type of cells used.

With the nonaqueous electrolyte battery pack of the present invention described above, the material of the electrolyte absorption member is a liquid-absorbent crosslinked resin produced by crosslinking a methyl vinyl ether/maleic anhydride copolymer with a polyfunctional isocyanate compound, and a liquid-absorbent crosslinked resin with excellent nonaqueous electrolyte absorption and holding properties is used, so even if nonaqueous electrolyte leaks from the cells, corrosion or shorting of the wiring circuit can be greatly suppressed.

EXAMPLES

The present invention will now be described in specific terms through examples.

Examples 1 to 6 relate to the degree of swelling, Examples 7 to 10 relate to the rate of swelling, and Examples 11 to 16 relate to the rate of absorption.

Example 1

A methyl vinyl ether/maleic anhydride copolymer (VEMA) (weight average molecular weight 900,000; trade name VEMA A106H5, made by Daicel Chemical Industries) was dissolved in methyl ethyl ketone (MEK), a trifunctional isocyanate compound (Coronate HL, made by Nippon Polyurethane Industry) was added as a crosslinking agent to this solution, and this mixture was gelled by being subjected to a crosslinking reaction at 25° C. for 24 hours, which yielded a liquid-absorbent crosslinked resin. The trifunctional isocyanate compound here was used in a proportion of 1 mol per 100 mol of the constituent monomeric units of VEMA, and the MEK was used in an amount such that the VEMA solids content would be 10 wt %.

Example 2

A liquid-absorbent crosslinked resin was obtained by repeating the same operation as in Example 1, except that the amount in which the trifunctional isocyanate compound was used was changed to 1 mol per 300 mol of the constituent monomeric units of VEMA.

Example 3

A liquid-absorbent crosslinked resin was obtained by repeating the same operation as in Example 1, except that the amount in which the trifunctional isocyanate compound was used was changed to 1 mol per 600 mol of the constituent monomeric units of VEMA.

Example 4

A liquid-absorbent crosslinked resin was obtained by repeating the same operation as in Example 1, except that the MEK was used in an amount such that the VEMA solids content would be 15 wt %.

Example 5

A liquid-absorbent crosslinked resin was obtained by repeating the same operation as in Example 4, except that the amount in which the trifunctional isocyanate compound was used was changed to 1 mol per 300 mol of the constituent monomeric units of VEMA.

Example 6

A liquid-absorbent crosslinked resin was obtained by repeating the same operation as in Example 4, except that the amount in which the trifunctional isocyanate compound was used was changed to 1 mol per 600 mol of the constituent monomeric units of VEMA.

Evaluation of Degree of Swelling 10 g of each of the gelled liquid-absorbent crosslinked resins from Examples 1 to 6 was soaked for 3 days in a large quantity of propylene carbonate, after which the liquid-absorbent crosslinked resin swollen with propylene carbonate was weighed in grams, and the quotient obtained by dividing the weight by VEMA solids content in grams was termed the degree of swelling. The results thus obtained are given in Table 1.

TABLE 1

| VEMA solids content in 10 g of liquid-absorbent crosslinked resin (wt %) | Crosslinking agent:VEMA (molar ratio) | Degree of swelling |
|---|---|---|
| Example 1 | 10 | 1:100 | 93.11 |
| Example 2 | 10 | 1:300 | 258.21 |
| Example 3 | 10 | 1:600 | 315.68 |
| Example 4 | 15 | 1:100 | 46.51 |
| Example 5 | 15 | 1:300 | 148.25 |
| Example 6 | 15 | 1:600 | 140.76 |

It can be seen from the results in Examples 1 to 3 that swelling occurred more readily when the amount of crosslinking agent used versus the VEMA was smaller. Also, a comparison of Examples 1 and 4, Examples 2 and 5, and Examples 3 and 6 reveals that the degree of swelling was lower when the VEMA solids content was higher.

In addition, a comparison of Examples 5 and 6 reveals that although a smaller amount of crosslinking agent was used in Example 6, there was no increase in the degree of swelling, and the behavior was clearly different from that when Examples 2 and 3 were compared. This may be because the VEMA solids content is 1.5 times that in Example 2 or 3.

Example 7

A VEMA (weight average molecular weight 900,000; trade name VEMA A106H5, made by Daicel Chemical Industries) was dissolved in methyl ethyl ketone (MEK), a trifunctional isocyanate compound (Coronate HL, made by Nippon Polyurethane Industry) was further added as a crosslinking agent to this solution, and this mixture was gelled by being subjected to a crosslinking reaction at 25° C. for 24 hours, which yielded a liquid-absorbent crosslinked resin. The trifunctional isocyanate compound here was used in a proportion of 1 mol per 100 mol of the constituent monomeric units of VEMA, and the MEK was used in an amount such that the VEMA solids content would be 5, 7.5, 10, or 15 wt %.

Figure 6:
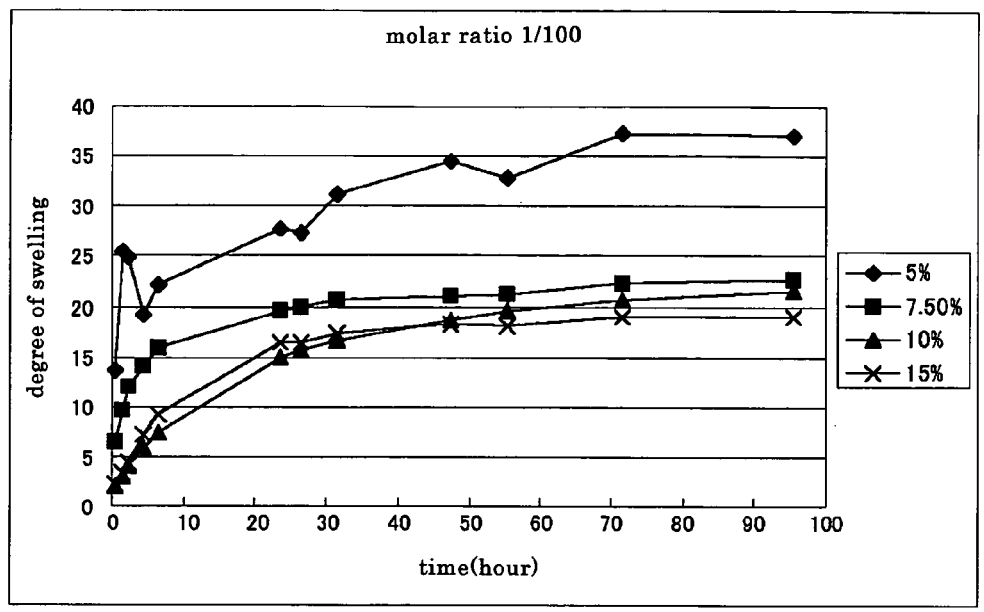
FIG. 6 is a graph of the degree of swelling of the liquid-absorbent crosslinked resin when the molar ratio of crosslinking agent to VEMA is 1:100.

10 g of the resulting liquid-absorbent crosslinked resin was dried in an oven under normal pressure (80° C., 10 minutes), and was further dried in a vacuum oven (80° C., 20 minutes). The dried resin thus obtained was soaked in a large quantity of propylene carbonate, the degree of swelling was calculated by weighing the liquid-absorbent crosslinked resin swollen with the propylene carbonate at regular time intervals, and the rate of swelling was evaluated. The higher is the degree of swelling, the higher is the rate of swelling. The results thus obtained are given in Table 2 and FIG. 6.

TABLE 2

Degree of swelling at crosslinking agent:VEMA (molar ratio) = 1:100

| Elapsed time (hours) | VEMA solids content (wt %) | | | |
|---|---|---|---|---|
| | 5 | 7.5 | 10 | 15 |
| 1 | 13.57 | 6.46 | 2.07 | 2.13 |
| 2 | 25.38 | 9.59 | 2.94 | 3.34 |
| 3 | 24.93 | 11.89 | 3.97 | 4.51 |
| 5 | 19.24 | 13.98 | 5.81 | 7.23 |
| 7 | 22.18 | 15.88 | 7.30 | 9.16 |
| 24 | 27.70 | 19.54 | 14.97 | 16.33 |
| 27 | 27.23 | 19.96 | 15.73 | 16.48 |
| 32 | 31.17 | 20.58 | 16.66 | 17.27 |
| 48 | 34.50 | 21.04 | 18.70 | 18.34 |
| 56 | 32.79 | 21.15 | 19.56 | 18.05 |

TABLE 2-continued

Degree of swelling at crosslinking agent:VEMA (molar ratio) = 1:100

| Elapsed time (hours) | VEMA solids content (wt %) | | | |
|---|---|---|---|---|
| | 5 | 7.5 | 10 | 15 |
| 72 | 37.29 | 22.23 | 20.73 | 18.90 |
| 96 | 37.07 | 22.70 | 21.59 | 18.97 |

It can be seen from Table 2 (FIG. 6) that when the molar ratio of the crosslinking agent and VEMA was 1:100, the rate of swelling was higher when the VEMA solids content 5 wt % than otherwise. It can also be seen that the difference was not great when the VEMA solids content was 7.5 wt %, 10 wt %, and 15 wt %.

Example 8

Figure 7:
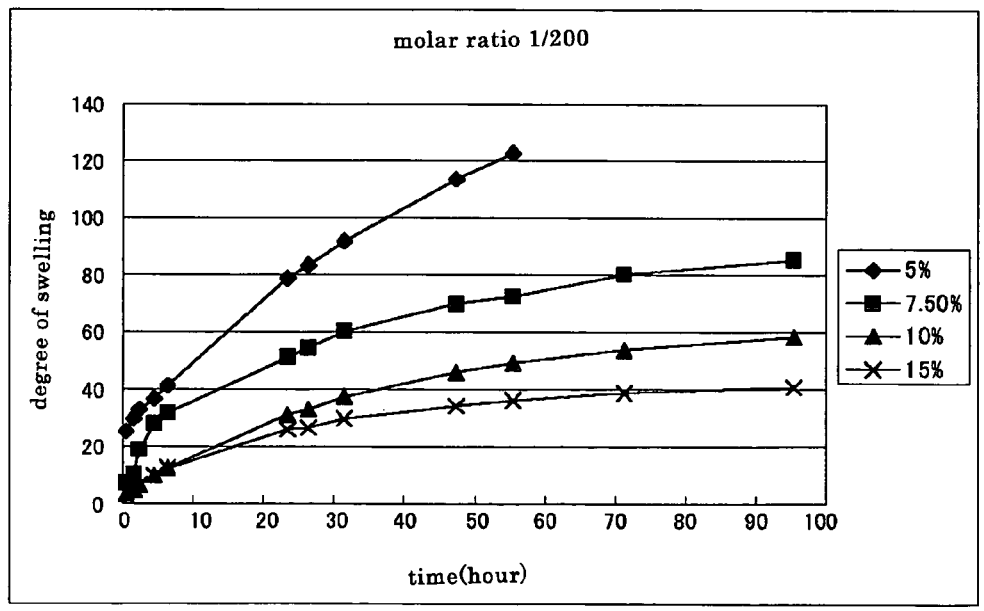
FIG. 7 is a graph of the degree of swelling of the liquid-absorbent crosslinked resin when the molar ratio of crosslinking agent to VEMA is 1:200.

A liquid-absorbent crosslinked resin was obtained and the degree of swelling was measured in the same manner as in Example 7, except that the amount in which the trifunctional isocyanate compound was used was changed to 1 mol per 200 mol of the constituent monomeric units of VEMA. The results thus obtained are given in Table 3 and FIG. 7.

TABLE 3

Degree of swelling at crosslinking agent:VEMA (molar ratio) = 1:200

| Elapsed time (hours) | VEMA solids content (wt %) | | | |
|---|---|---|---|---|
| | 5 | 7.5 | 10 | 15 |
| 1 | 25.03 | 6.93 | 2.95 | 3.57 |
| 2 | 29.59 | 10.52 | 4.77 | 5.30 |
| 3 | 32.88 | 18.59 | 6.24 | 6.54 |
| 5 | 36.74 | 27.87 | 9.68 | 9.83 |
| 7 | 41.45 | 31.44 | 12.30 | 12.31 |
| 24 | 78.76 | 50.83 | 30.79 | 25.52 |
| 27 | 83.41 | 54.21 | 32.79 | 26.68 |
| 32 | 91.79 | 59.95 | 37.11 | 29.44 |
| 48 | 113.37 | 69.47 | 45.88 | 33.89 |
| 56 | 122.52 | 72.47 | 49.11 | 35.92 |
| 72 | * | 79.93 | 53.81 | 38.63 |
| 96 | — | 85.16 | 57.84 | 40.82 |

* Could not be measured

It can be seen from Table 3 (FIG. 7) that when the molar ratio of the crosslinking agent and VEMA was 1:200, the rate of swelling decreased as the VEMA solids content increased.

When the VEMA solids content was 5%, the liquid-absorbent crosslinked resin crumbled after 72 hours and could not be weighed.

Example 9

Figure 8:
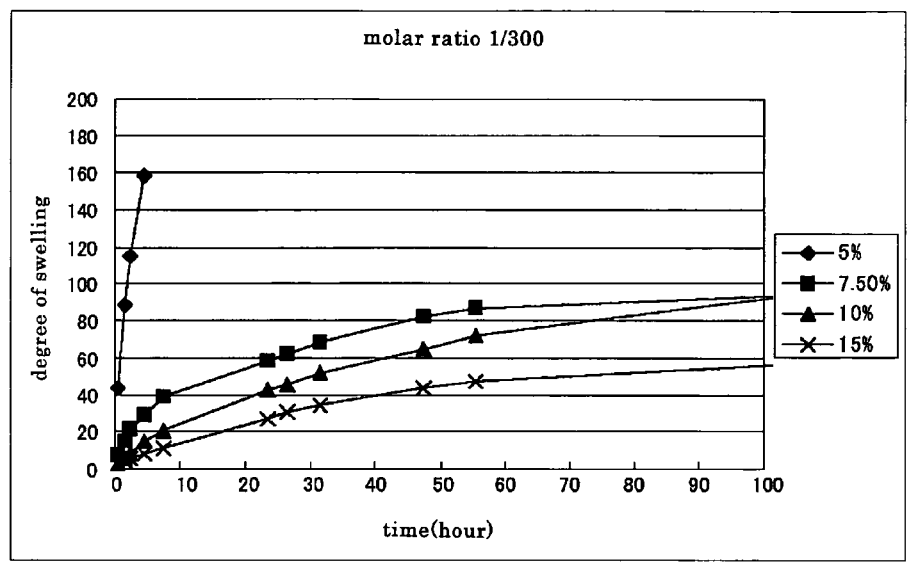
FIG. 8 is a graph of the degree of swelling of the liquid-absorbent crosslinked resin when the molar ratio of crosslinking agent to VEMA is 1:300.

A liquid-absorbent crosslinked resin was obtained and the degree of swelling was measured in the same manner as in Example 7, except that the amount in which the trifunctional isocyanate compound was used was changed to 1 mol per 300 mol of the constituent monomeric units of VEMA. The results thus obtained are given in Table 4 and FIG. 8.

TABLE 4

Degree of swelling at crosslinking agent:VEMA (molar ratio) = 1:300

| Elapsed time (hours) | VEMA solids content (wt %) | | | |
|---|---|---|---|---|
| | 5 | 7.5 | 10 | 15 |
| 1 | 43.43 | 7.03 | 3.10 | 2.47 |
| 2 | 88.92 | 14.43 | 5.91 | 4.11 |
| 3 | 115.63 | 20.98 | 8.60 | 5.43 |
| 5 | 158.27 | 28.25 | 14.39 | 8.06 |
| 8 | * | 38.44 | 20.33 | 11.22 |
| 24 | — | 58.16 | 42.09 | 27.07 |
| 27 | — | 61.32 | 45.61 | 30.07 |
| 32 | — | 67.79 | 51.84 | 34.32 |
| 48 | — | 81.69 | 64.71 | 43.37 |
| 56 | — | 86.63 | 71.86 | 46.77 |
| 145 | — | 99.85 | 111.10 | 64.11 |

* Could not be measured

It can be seen from Table 4 (FIG. 8) that when the molar ratio of the crosslinking agent and VEMA was 1:300, the rate of swelling decreased as the VEMA solids content increased.

When the VEMA solids content was 5%, the liquid-absorbent crosslinked resin crumbled before 8 hours had elapsed, and could not be weighed.

Example 10

Figure 9:
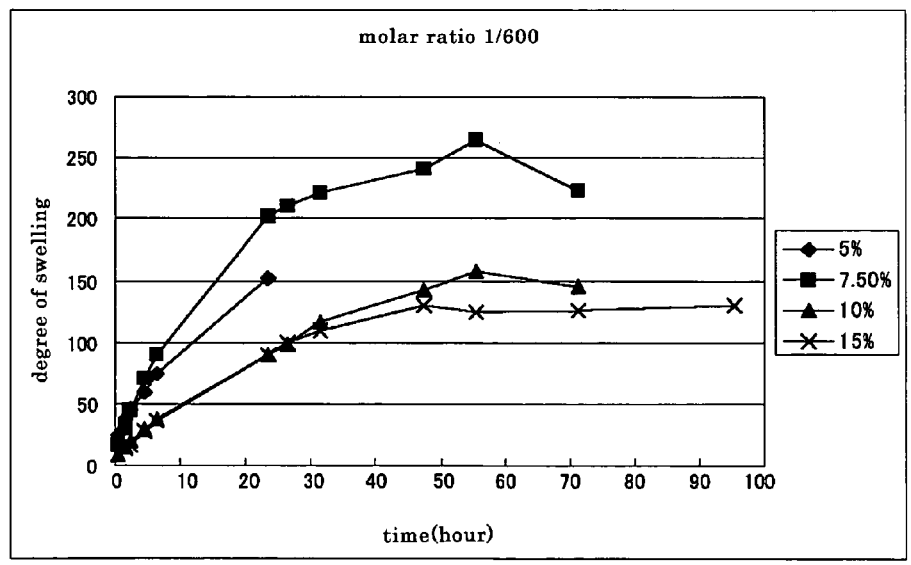
FIG. 9 is a graph of the degree of swelling of the liquid-absorbent crosslinked resin when the molar ratio of crosslinking agent to VEMA is 1:600.

A liquid-absorbent crosslinked resin was obtained and the degree of swelling was measured in the same manner as in Example 7, except that the amount in which the trifunctional isocyanate compound was used was changed to 1 mol per 600 mol of the constituent monomeric units of VEMA. The results thus obtained are given in Table 5 and FIG. 9.

TABLE 5

Degree of swelling at crosslinking agent:VEMA (molar ratio) = 1:600

| Elapsed time (hours) | VEMA solids content (wt %) | | | |
|---|---|---|---|---|
| | 5 | 7.5 | 10 | 15 |
| 1 | 24.37 | 16.63 | 8.18 | 7.90 |
| 2 | 36.82 | 30.77 | 14.82 | 13.62 |
| 3 | 44.94 | 44.51 | 19.01 | 17.25 |
| 5 | 59.09 | 70.19 | 29.18 | 27.64 |
| 7 | 75.18 | 89.34 | 37.54 | 35.88 |
| 24 | 151.40 | 202.18 | 90.06 | 89.23 |
| 27 | * | 209.50 | 97.59 | 100.18 |
| 32 | — | 221.32 | 116.06 | 109.07 |
| 48 | — | 239.95 | 143.08 | 129.45 |
| 56 | — | 263.62 | 157.04 | 124.02 |
| 72 | — | 222.40 | 145.19 | 126.45 |
| 96 | — | — | — | 129.68 |

* Could not be measured

It can be seen from Table 5 (FIG. 9) that when the molar ratio of the crosslinking agent and VEMA was 1:600, if the VEMA solids content was 5%, the liquid-absorbent crosslinked resin crumbled before 27 hours had elapsed, and could not be weighed. Even when the VEMA solids content was 7.5 wt % and 10 wt %, the liquid-absorbent crosslinked resin crumbled before 96 hours had elapsed, and could not be weighed.

Example 11

A methyl vinyl ether/maleic anhydride copolymer (VEMA) (weight average molecular weight 900,000; trade name VEMA A106H5, made by Daicel Chemical Industries) was dissolved in methyl ethyl ketone (MEK), a trifunctional isocyanate compound (Coronate HL, made by Nippon Polyurethane Industry) was added as a crosslinking agent to this solution, and before this mixture gelled it was applied to a polyester film in an amount of 10 g (solids) per square meter, and this coating was dried for 10 minutes at 80° C., which yielded a liquid-absorbent film having a liquid-absorbent crosslinked resin layer. The trifunctional isocyanate compound here was used in a proportion of 1 mol per 100 mol of the constituent monomeric units of VEMA, and the MEK was used in an amount such that the VEMA solids content would be 10 wt %.

Example 12

A liquid-absorbent film was obtained by repeating the same operation as in Example 11, except that the amount in which the trifunctional isocyanate compound was used was changed to 1 mol per 300 mol of the constituent monomeric units of VEMA.

Example 13

A liquid-absorbent film was obtained by repeating the same operation as in Example 11, except that the amount in which the trifunctional isocyanate compound was used was changed to 1 mol per 600 mol of the constituent monomeric units of VEMA.

Example 14

A liquid-absorbent crosslinked resin was obtained by repeating the same operation as in Example 11, except that the MEK was used in an amount such that the VEMA solids content would be 15 wt %.

Example 15

A liquid-absorbent film was obtained by repeating the same operation as in Example 14, except that the amount in which the trifunctional isocyanate compound was used was changed to 1 mol per 300 mol of the constituent monomeric units of VEMA.

Example 16

A liquid-absorbent film was obtained by repeating the same operation as in Example 14, except that the amount in which the trifunctional isocyanate compound was used was changed to 1 mol per 600 mol of the constituent monomeric units of VEMA.

Evaluation of Rate of Absorption

The liquid-absorbent films of Examples 11 to 16 were each inclined to 30 degrees from the horizontal plane, 0.02 mL of a carbonate-based mixed solvent (ethylene carbonate, propylene carbonate, and dimethyl carbonate) was dropped onto the liquid-absorbent crosslinked resin layer of the film, and the distance the mixed solvent moved before being absorbed was measured. The results thus obtained are given in Table 6. The movement distance over a polyester film not provided with a liquid-absorbent crosslinked resin layer was over 25 cm. The greater is the movement distance, the slower is the absorption. The "VEMA solids content" in Table 6 is the VEMA solids content in the mixture when a mixture of VEMA and trifunctional isocyanate compound is applied to a polyester film.

TABLE 6

|  | VEMA solids content | Crosslinking agent:VEMA (molar ratio) | Movement distance (cm) |
|---|---|---|---|
| Example 11 | 10 wt % | 1:100 | 15.3 |
| Example 12 | 10 wt % | 1:300 | 14.4 |
| Example 13 | 10 wt % | 1:600 | 16.2 |
| Example 14 | 15 wt % | 1:100 | 18.4 |
| Example 15 | 15 wt % | 1:300 | 17.0 |
| Example 16 | 15 wt % | 1:600 | 15.9 |

It can be seen from Table 6 that the rate of absorption increases as the amount of crosslinking agent used with respect to the VEMA decreases. A comparison of Examples 13 and 16 reveals that the movement distance is higher in Example 13, the reason for which is that the liquid-absorbent crosslinked resin layer is dissolved in the electrolyte.

Comparative Example 1

A methyl vinyl ether/maleic anhydride copolymer (VEMA) (weight average molecular weight 900,000; trade name VEMA A106H5, made by Daicel Chemical Industries) was dissolved in methyl ethyl ketone (MEK), a trifunctional isocyanate compound (Coronate HL, made by Nippon Polyurethane Industry) was added as a crosslinking agent to this solution, and this mixture was gelled by being subjected to a crosslinking reaction at 25° C. for 24 hours, which yielded a liquid-absorbent crosslinked resin. The trifunctional isocyanate compound here was used in a proportion of 1, 0.5 or 0.2 mol per 1 mol of the constituent monomeric units of VEMA, and the MEK was used in an amount such that the VEMA solids content would be 5 wt %.

Figure 10:
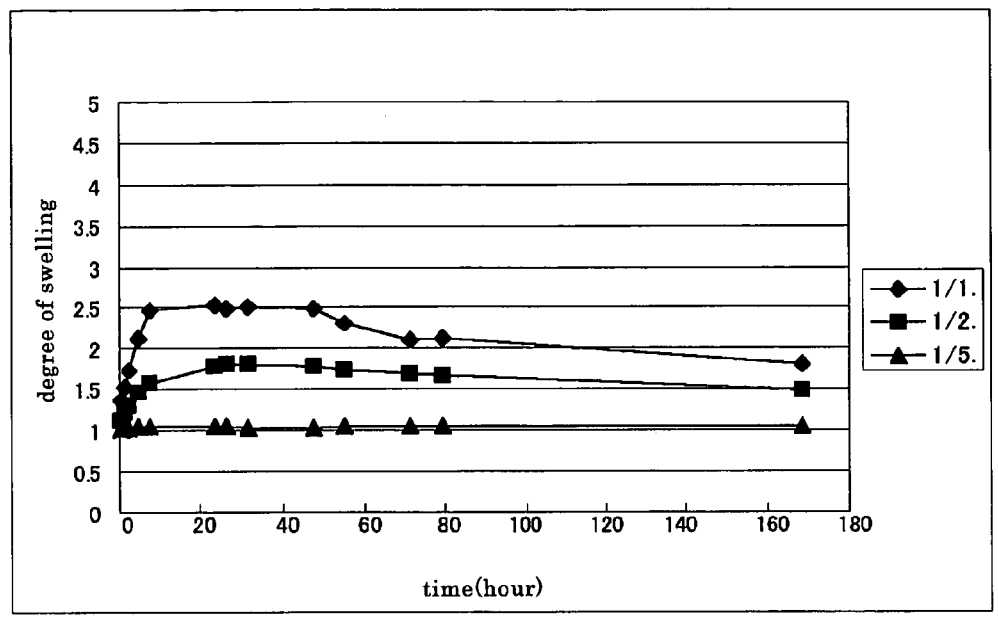
FIG. 10 is a graph of the degree of swelling of the liquid-absorbent crosslinked resin when a large amount of crosslinking agent is used.

10 g of the resulting liquid-absorbent crosslinked resin was dried in an oven under normal pressure (80° C., 10 minutes), and was further dried in a vacuum oven (80° C., 20 minutes). The dried resin thus obtained was soaked in a large quantity of propylene carbonate, and the degree of swelling was measured by weighing the liquid-absorbent crosslinked resin swollen with the propylene carbonate at regular time intervals. The results thus obtained are given in Table 7 and FIG. 10.

TABLE 7

Degree of swelling at VEMA solids content 5 wt %

| Elapsed time (hours) | Crosslinking agent:VEMA molar ratio | | |
|---|---|---|---|
|  | 1:1 | 1:2 | 1:5 |
| 1 | 1.36 | 1.12 | 1.02 |
| 2 | 1.52 | 1.22 | 1.03 |
| 3 | 1.73 | 1.31 | 1.03 |
| 5 | 2.12 | 1.45 | 1.04 |
| 8 | 2.47 | 1.57 | 1.04 |
| 24 | 2.54 | 1.78 | 1.06 |
| 27 | 2.50 | 1.81 | 1.06 |
| 32 | 2.52 | 1.80 | 1.02 |
| 48 | 2.50 | 1.78 | 1.02 |
| 56 | 2.30 | 1.74 | 1.04 |
| 72 | 2.11 | 1.70 | 1.04 |
| 80 | 2.13 | 1.66 | 1.04 |
| 169 | 1.80 | 1.49 | 1.04 |

It can be seen from Table 7 (FIG. 10) that when the amount of crosslinking agent used is markedly higher than that in the Examples, swelling is slow and does not readily occur.

Comparative Example 2

A methyl vinyl ether/maleic anhydride copolymer (VEMA) (weight average molecular weight 900,000; trade name VEMA A106H5, made by Daicel Chemical Industries) was dissolved in methyl ethyl ketone (MEK), a trifunctional isocyanate compound (Coronate HL, made by Nippon Polyurethane Industry) was added as a crosslinking agent to this solution, and this mixture was gelled by being subjected to a crosslinking reaction at 25° C. for 24 hours, which yielded a liquid-absorbent crosslinked resin. The trifunctional isocyanate compound here was used in a proportion of 1 mol per 3000 mol of the constituent monomeric units of VEMA, and the MEK was used in an amount such that the VEMA solids content would be 15 wt %.

When the resulting liquid-absorbent crosslinked resin was soaked in a large quantity of propylene carbonate, the liquid-absorbent crosslinked resin crumbled after 24 hours, turning into a liquid with fluidity.

Example 17

Example of a Liquid-Absorbent Composition Made from a Liquid-Absorbent Crosslinked Resin Powder A methyl vinyl ether/maleic anhydride copolymer (VEMA) (weight average molecular weight 900,000; trade name VEMA A106H5, made by Daicel Chemical Industries) was dissolved in an amount of 10 wt % in methyl ethyl ketone (MEK), a trifunctional isocyanate compound (Coronate HL, made by Nippon Polyurethane Industry) was added as a crosslinking agent to this solution, and this mixture was gelled by being subjected to a crosslinking reaction at 25° C. for 24 hours, which yielded a liquid-absorbent crosslinked resin. The molar ratio of the VEMA and crosslinking agent here was 1/800. 100 g of the resulting gel (liquid-absorbent crosslinked resin) was dried in a vacuum oven (80° C., 30 minutes), and the dried resin thus obtained was pulverized in a high-speed pulverizer, which yielded a powdered gel of a liquid-absorbent crosslinked resin.

A binder solution for mixing with the powdered gel of a liquid-absorbent crosslinked resin was then prepared as follows. First, VEMA (the binder) was dissolved in MEK such that the solids content was 15 wt %, then ethanol was added to this solution such that the VEMA solids content would be 10%, and this product was stirred for 3 hours in a jar mill inside a 60° C. oven under normal pressure. The reason for adding the ethanol here is that when MEK alone is used as the solvent, the powdered gel of a liquid-absorbent crosslinked resin swells so much that coating becomes difficult, but ethanol swells very little, so it has no adverse effect on coatability.

Next, a liquid-absorbent composition was obtained by mixing the powdered gel of a liquid-absorbent crosslinked resin with the binder solution such that the solids content of the former would be 10% or 20%.

The liquid-absorbent compositions thus obtained were each used to coat a polyester film in an amount of 100 g/m², and the coating was dried for 10 minutes at 80° C. to produce a liquid-absorbent sheet on which a liquid-absorbent crosslinked resin layer was formed.

This liquid-absorbent sheet was inclined to 30 degrees from the horizontal plane, 0.02 mL of a carbonate-based mixed solvent (ethylene carbonate, propylene carbonate, and dimethyl carbonate) was dropped onto the liquid-absorbent crosslinked resin layer of the sheet, and the distance the mixed solvent moved before being absorbed was measured. The results thus obtained are given in Table 8. The movement distance over a polyester film not provided with a liquid-absorbent crosslinked resin layer was over 25 cm. The greater is the movement distance, the slower is the absorption.

TABLE 8

| Powdered gel of liquid-absorbent crosslinked resin | Movement distance (cm) |
|---|---|
| 10% solids content | 14.3 |
| 20% solids content | 13.9 |

It can be seen from Table 8 that a liquid-absorbent sheet produced by mixing a powdered gel of a liquid-absorbent crosslinked resin into a binder resin is able to absorb carbonate-based solvents rapidly.

Example 18

Test of Electrolyte Absorption with Simulated Battery Pack

Figure 11:
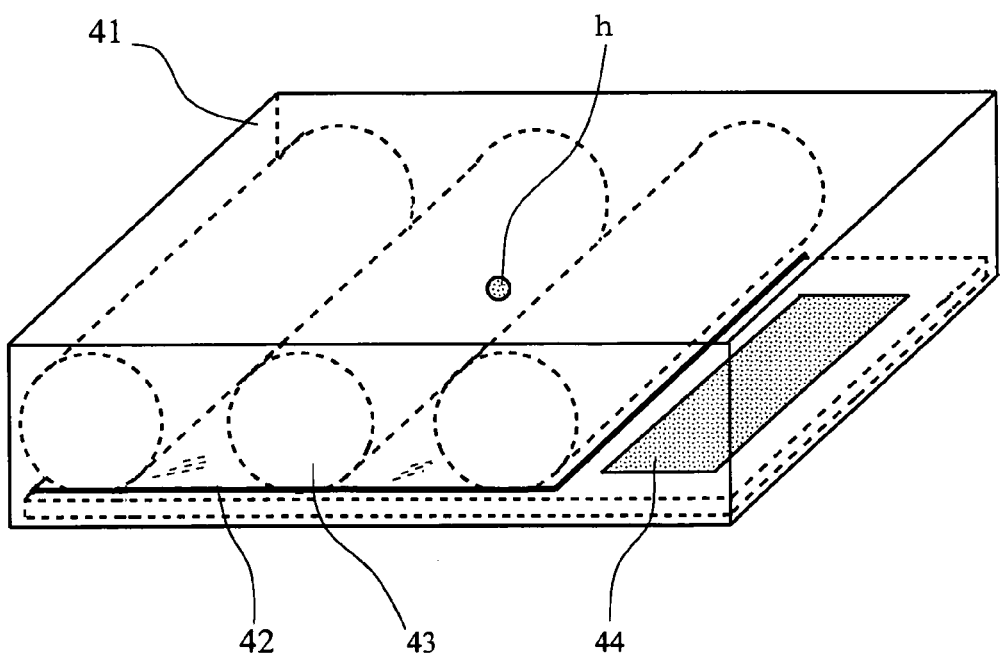
FIG. 11 is a diagram illustrating the electrolyte absorption test of a simulated battery pack.

As shown in FIG. 11, an ABS resin box 41 measuring 7.0 cm in length, 7.9 cm in width, and 2.3 cm in height was prepared, the liquid-absorbent sheet 42 as shown in FIG. 11 (solids content of powdered gel of liquid-absorbent crosslinked resin: 10%), which measured 6.5 cm in length, 6.5 cm in width, and 100 μm in thickness was laid at the bottom of the box, three lithium ion cells 43 were installed over this sheet, and a glass epoxy substrate 44 was installed as a circuit board next to the cells (see FIG. 11).

A single hole h was made with an electric drill in the side of the middle of the three cells 43, and a test was conducted in which the electrolyte that leaked from this hole was absorbed by the liquid-absorbent sheet. The battery pack was left overnight with the hole h open, after which the inside of the pack was observed and checked for no leakage onto the glass epoxy substrate. The weight reduction in the cell in which the hole h was made was 2.5 g, and since the increase in weight of the liquid-absorbent sheet was 2.5 g, this tells us that the liquid-absorbent sheet absorbed all of the leaked electrolyte.

INDUSTRIAL APPLICABILITY

The present invention provides a liquid-absorbent composition and liquid-absorbent sheet containing a liquid-absorbent crosslinked resin that shows excellent absorption of non-aqueous electrolyte from a nonaqueous electrolyte secondary cell used in a nonaqueous electrolyte battery pack (and particularly a lithium ion nonaqueous electrolyte rechargeable battery pack).

The invention claimed is:

1. A non-aqueous electrolyte battery pack, comprising a battery case and disposed within the battery case a non-aqueous electrolyte battery cell, a wiring circuit board, and an electrolyte absorption member for absorbing electrolyte in the event that electrolyte leaks from a non-aqueous electrolyte battery cell, wherein said electrolyte absorption member is formed from a liquid-absorbent composition, comprising: a powder of a liquid-absorbent crosslinked resin and a binder resin, wherein the liquid-absorbent crosslinked resin comprises a methyl vinyl ether/maleic anhydride copolymer crosslinked with a polyfunctional isocyanate compound.

2. The liquid-absorbent composition according to claim 1, wherein said powder has an average particle diameter of 0.1 to 150 μm.

3. The liquid-absorbent composition according to claim 1, wherein said methyl vinyl ether/maleic anhydride copolymer has a weight average molecular weight of 50,000 to 1,200,000.

4. The liquid-absorbent composition according to claim 1, wherein the polyfunctional isocyanate compound is used in an amount of 0.1 to 2 mol per 100 mol of the constituent monomer units of the methyl vinyl ether/maleic anhydride copolymer.

5. The liquid-absorbent composition according to claim 1, wherein the polyfunctional isocyanate compound is a trifunctional isocyanate compound.

6. A non-aqueous electrolyte battery pack, comprising a battery case and disposed within the battery case a non-aqueous electrolyte battery cell, a wiring circuit board, and an electrolyte absorption member for absorbing electrolyte in the event that electrolyte leaks from a non-aqueous electrolyte battery cell, wherein said electrolyte absorption member is formed from a liquid-absorbent composition or liquid absorbent sheet, comprising: a supporting substrate and formed on one side thereof a liquid-absorbent crosslinked resin layer, wherein the liquid-absorbent crosslinked resin layer comprises a methyl vinyl ether/maleic anhydride copolymer crosslinked with a polyfunctional isocyanate compound.

7. The liquid-absorbent sheet according to claim 6, wherein an adhesive layer is formed on the other side of the supporting substrate.

8. The liquid-absorbent sheet according to claim 6, wherein said liquid-absorbent crosslinked resin layer contains a pressure-sensitive adhesive.

9. The liquid-absorbent sheet according to claim 6, wherein said methyl vinyl ether/maleic anhydride copolymer has a weight average molecular weight of 50,000 to 1,200,000.

10. The liquid-absorbent sheet according to claim 6, wherein the polyfunctional isocyanate compound is used in an amount of 0.1 to 2 mol per 100 mol of the constituent monomer units of the methyl vinyl ether/maleic anhydride copolymer.

11. The liquid-absorbent sheet according to claim 6, wherein the polyfunctional isocyanate compound is a trifunctional isocyanate compound.

12. A method for manufacturing a non-aqueous electrolyte battery pack, comprising: forming a liquid-absorbent crosslinked resin by dissolving a solution consisting of a methyl vinyl ether/maleic anhydride copolymer in an amount of 3 to 35 wt % in a solvent with a solubility parameter (SP) value of 9 to 14, and adding a polyfunctional isocyanate compound to this solution to perform a crosslinking reaction, forming a liquid-absorbent composition comprising a powder of the liquid-absorbent crosslinked resin and a binder resin, forming an electrolyte absorption member from the liquid-absorbent composition, and disposing a non-aqueous electrolyte battery cell, a wiring circuit board, and the electrolyte absorption member for absorbing electrolyte in the event that electrolyte leaks from a non-aqueous electrolyte battery cell, within a battery case.

13. The manufacturing method according to claim 12, wherein said methyl vinyl ether/maleic anhydride copolymer has a weight average molecular weight of 50,000 to 1,200,000.

14. The manufacturing method according to claim 12, wherein the polyfunctional isocyanate compound is used in an amount of 0.1 to 2 mol per 100 mol of the constituent monomer units of the methyl vinyl ether/maleic anhydride copolymer.

15. The manufacturing method according to claim 12, wherein the polyfunctional isocyanate compound is a trifunctional isocyanate compound.

* * * * *